Patented May 11, 1954

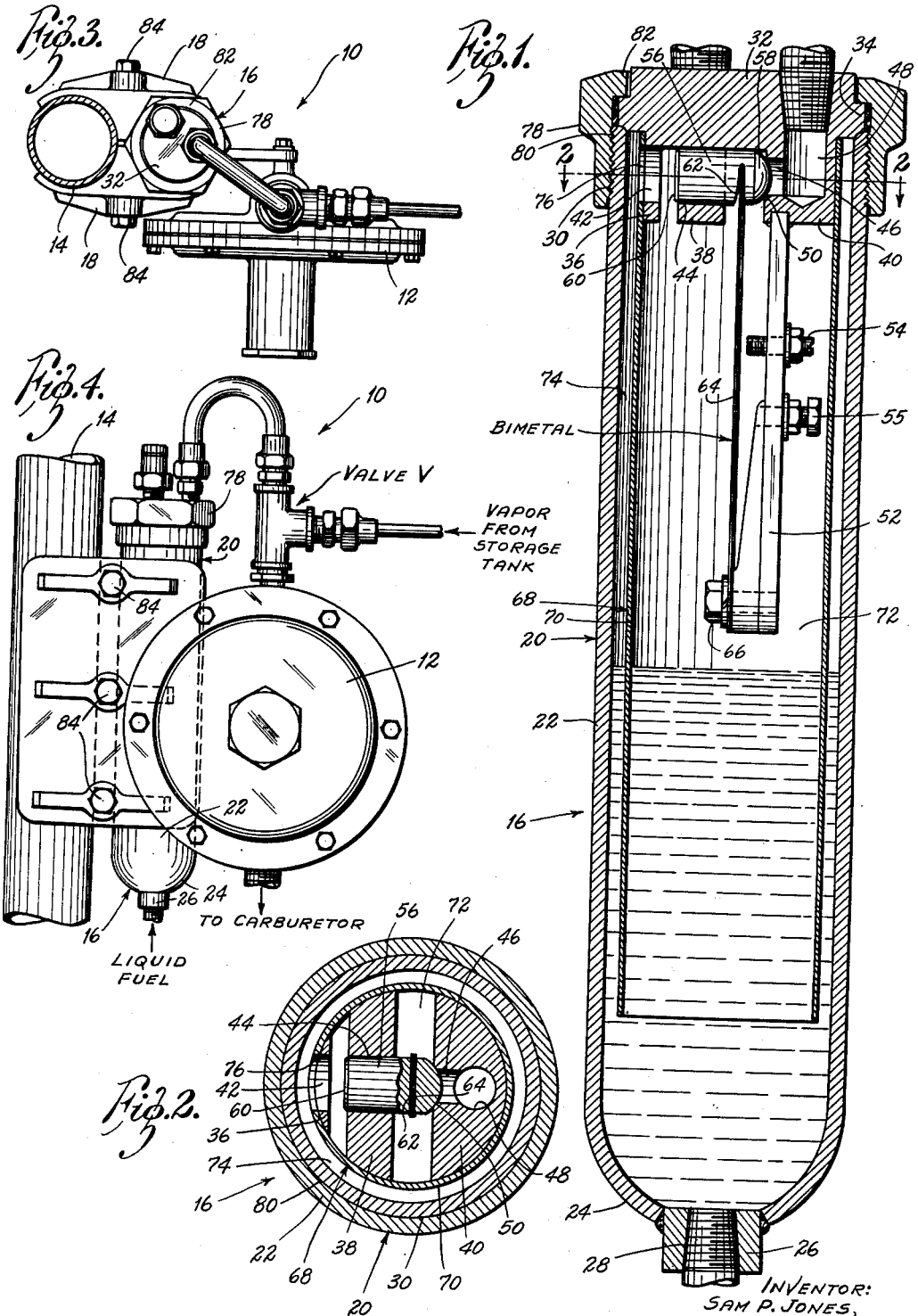

2,677,937

UNITED STATES PATENT OFFICE 2,677,937

VAPORIZER

Sam P. Jones, Dallas, Tex.

Application September 21, 1949, Serial No. 117,051

6 Claims. (Cl. 62—1)

The present invention relates generally to the vaporizer art, and more particularly to a novel vaporizer in which the temperature of the gas produced is controlled within predetermined limits.

The device is shown and will be described as used with internal combustion engines and L. P. (liquid petroleum) fuel, but it is to be understood that it is equally applicable for use with other types of engines and other fuels and that it can also be used with other substances for other purposes, such as for vaporizing anhydrous ammonia for use as a fertilizer.

In one form of the invention, the device comprises two vaporizer chambers which are maintained at different temperatures, the upper portion of one chamber also acting as a mixing chamber. The two chambers are in communication adjacent their upper ends and an outlet is provided leading from the mixing chamber. The flow of gas from the one chamber to the mixing chamber and from the outlet is controlled by a valve member responsive to the temperature in the mixing chamber whereby the temperatures of the gas in the mixing chamber and the gas leaving the outlet are controlled within predetermined limits.

It is an object of the present invention to provide a novel vaporizer in which the temperature of the vaporized gas produced is controlled within predetermined limits.

Another object is to provide a vaporizer for use with internal combustion engines in which the material is vaporized by the heat from the engine's exhaust stack.

Another object is to provide a vaporizer containing a plurality of vaporizing chambers which are maintained at different temperatures.

Another object is to provide a vaporizer in which the amount of gas flowing from the vaporizing chambers is controlled by a temperature-responsive valve member.

Another object is to provide a vaporizer in which the temperature control valve also acts as fuel overflow check valve.

Another object is to provide novel heat transfer clamps for transferring heat from the engine exhaust stack to the vaporizer.

Other objects are to provide a vaporizer which is of rugged construction, which contains a minimum number of parts, and which is relatively inexpensive to manufacture.

Further objects and advantages of the present invention will be apparent from the following description, reference being had to the accompanying drawing wherein a preferred embodiment of the present invention is shown, in which:

Fig. 1 is a vertical diametrical sectional view of a vaporizer constructed in accordance with the teachings of the present invention;

Fig. 2 is a horizontal sectional view taken on the line 2—2 in Fig. 1;

Fig. 3 is a top plan view of the vaporizer shown in its assembled position with an engine exhaust stack and a pressure regulator; and Fig. 4 is a front elevational view of the assembly shown in Fig. 3.

Referring to the drawings more particularly by reference numerals, 10 indicates generally a vaporizer assembly which includes a pressure regulator 12, an engine exhaust stack 14, and a vaporizer 16 and heat transfer clamps 18 embodying the teachings of the present invention.

The pressure regulator 12 and the engine exhaust stack 14 are well known in the art and obviously are not part of the present invention.

As shown in Fig. 1, the vaporizer 16 includes a vertically extending tubular housing 20 having a vertical side wall 22 and a rounded bottom wall 24. An inlet fitting 26 having a threaded opening 28 formed therein is contained in the bottom wall 24. The upper end of the housing 20 contains external threads 30.

A closure member 32 containing an outwardly extending flange-like portion 34 is disposed on top of the housing 20, the bottom edge of the flange-like portion 34 bearing on the top edge of the side wall 22. The closure member 32 also contains a downwardly extending portion which is divided into three parallel sections 36, 38 and 40 (Fig. 2), the outer peripheries of which form segments of a common circle.

The sections 36 and 38 contain aligned horizontal passageways 42 and 44, respectively, and the section 40 contains a short horizontal passageway 46 which leads into the bottom of a vertical outlet passageway 48. The passageway 46 is smaller than the passageways 42 and 44 and provides a valve seat 50 at the inner edge thereof for a purpose to appear.

A support 52 is rigidly fastened to the bottom of the section 40 and extends downwardly therefrom. Adjustable setscrews 54 and 55 are disposed midway of the support 52 for a purpose to appear.

A cylindrical valve member 56 containing a rounded end portion 58 and a flat end portion 60 is slidably disposed in the passageway 44. A groove 62 with diverging side walls is contained in the bottom of the valve member 56 adjacent the rounded end portions 58.

The bottom end of an upwardly extending bimetallic strip 64 is fastened adjacent the bottom of the support 52 by a bolt 66 and the upper end of the strip is disposed in the groove 62.

An inner cylindrical member 68 having a vertical side wall 70 is secured to the peripheries of the sections 36, 38 and 40 as by welding and extends downwardly into the tubular housing so as to provide a cylindrical inner vaporizing chamber 72, and an annular outer vaporizing chamber 74 between the vertical walls 70 and 22. The cylindrical member 68 contains an opening 76 adjacent the upper end thereof in alignment with the passageway 42.

A retaining ring 78 having internal threads 80 and an inwardly extending flange-like portion 82, is disposed on top of the closure member 32, the threads 80 and the flange-like portion 82 of the ring 78 being in engagement with the threads 30 and the flange-like portion 34, respectively.

The heat transfer clamps 18 which are preferably of the cast aluminum of the configuration shown in Figs. 3 and 4 are disposed one on each side of the vaporizer 20 in heat-transfer contact with it and the engine exhaust stack 14. The two clamps 18 are held in position by through bolts 84.

Operation

When the engine (not shown) is started, the gas for its operation comes from the storage tank through the pressure regulator 12 as shown in Fig. 4.

After the engine has been in operation for a short time, the heat from the exhaust stack 14 passes through the heat transfer clamps 18 to the housing 20. This causes the liquid in the outer chamber 74 to be vaporized and to pass over into the inner chamber 72 through the opening 76. The vaporization of the liquid in the outer chamber 74 drives the liquid level downwardly below the lower end of the cylindrical member 68 because the outlet passageway 46 is closed thereby preventing the escape of the vapor. The gas then circulates between the two chambers 72 and 74, absorbing more heat each time it passes through the chamber 74.

As the temperature within the chamber 72 rises, the bimetallic strip 64 will start to bend with its center portion moving toward the setscrew 54. After the center of the strip 64 contacts the setscrew 54, any additional rise in its temperature will cause its upper end and the valve member 56 to move to the left thereby breaking the rounded portion 58 away from the valve seat 50. As soon as the rounded portion 58 breaks away from the seat 50, the valve member 56 will move suddenly to the left due to the sudden equalization of gas pressure at both ends, thereby permitting the vaporized gas to leave the chamber 72 through the passageways 46 and 48. When the pressure in the passageway 48 is above a predetermined amount, the check valve V (Fig. 4) closes off the line leading from the storage tank so that all the gas going to the engine is supplied by the vaporizer 10.

As the temperature of the gas in the chamber 72 increases, the valve member 56 will continue to move to the left, and, as the flat portion 60 approaches the passageway 42, the high temperature gas entering from the chamber 74 will be throttled, and, if the temperature is high enough, it will finally be closed off.

If the passageway 42 is closed, the increased temperature of the gas in the chamber 74 will drive the liquid level in that chamber downwardly and away from the heat transfer clamps 18 so as to reduce the rate of vaporization. Also, the transfer of heat from the housing 20 to the cylindrical member 68 through the chamber 74 is greatly reduced because of the poor conductivity of the gas in the chamber 74, thereby tending to maintain the temperature of the gas in the chamber 72 at a constant level.

Also, if the engine demand is greatly reduced, the gas within the chambers 72 and 74 will drive the liquid level downwardly in the vaporizer and away from the heating area of the vaporizer, and if necessary, out through the inlet pipe at the bottom so as to limit the pressure (and temperature) of the gas as more freely described in my Patent No. 2,252,261, issued August 12, 1941.

Furthermore, the amount of gas necessary to operate an engine when it is running at no load is enough to prevent the vaporizer from overheating. For example, a 100 H. P. engine operating at 2000 R. P. M. would consume approximately three gallons per hour at no load. The latent heat of vaporization of butane is approximately 800 B. t. u. per gallon so that there would be at least 2400 B. t. u. of heat per hour being removed from the vaporizer at no load.

When the temperature of the gas in the chamber 72 drops below a predetermined level, the bimetallic strip 64 will start to straighten, thereby causing the valve member 56 to move to the right and admit more and more of the hotter gas from the chamber 74. If, however, the temperature of the gas leaving the vaporizer is below the minimum required for the engine, the rounded portion 58 will move into engagement with the valve seat 50 thereby stopping the flow of gas until it rises above the required minimum temperature.

The setscrews 54 and 55 can be adjusted to vary the predetermined temperature limits.

If the device is in operation delivering gas to an engine and the liquid rises too high in the chamber 72 so that it tends to overflow through the passageways 46 and 48, the relatively cold liquid will cause the bimetallic strip 64 to straighten and move the valve member 58 against the valve seat 50 thereby closing the outlet.

Thus, it is apparent that there has been provided a novel vaporizer which maintains the gas leaving it between predetermined temperatures, which prevents the liquid fuel from overflowing, and which is simple and rugged in construction yet relatively inexpensive to manufacture.

It is to be understood that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What is claimed is:

1. A device of the type described, comprising a first vaporizing chamber; a second vaporizer chamber in free and open communication with the bottom of the first chamber and having an outlet leading therefrom; passage means connecting the tops of the two chambers; means limiting the flow of gas in the passage means; and means controlling the flow of gas from the outlet whereby the temperature of said gas leaving the outlet is within predetermined limits; said last two named means being responsive to the temperature within one of said chambers.

2. A device of the type described, comprising a first vaporizer chamber; a second vaporizer chamber disposed within the first chamber and having an outlet leading therefrom, said chambers being in free and open communication adjacent their lower extremities; said first chamber being more responsive to ambient temperatures external to the device than said second chamber; passage means between the two chambers adjacent the upper ends thereof; and means limiting the flow of gas in the passage means and controlling the flow of gas from the outlet whereby the temperature of said gas leaving the outlet is within predetermined limits; said last-named means being responsive to the temperature in the second chamber.

3. A device of the type described, comprising a vertical elongated container; a sleeve-like member disposed within said container and spaced from the walls thereof, the container and the sleeve-like member being in communication adjacent their lower ends; a closure member closing the upper ends of the container and the sleeve-like member, said closure member containing a passageway leading from the interior of the sleeve-like member; an opening through the sleeve-like member adjacent the upper end thereof; and valve means cooperating with the passageway and the opening so as to control flow therethrough, said valve means being responsive to the temperature within the sleeve-like member.

4. A device of the type described, comprising a vertical elongated container; a sleeve-like member disposed within said container and spaced from the walls thereof, the container and the sleeve-like member being in communication adjacent their lower ends; a closure member closing the upper ends of the container and the sleeve-like member, said closure member containing a passageway leading from the interior of the sleeve-like member and providing a valve seat at the inner end thereof; an opening through the sleeve-like member adjacent the upper end thereof; and a valve member movable between the valve seat and said opening so as to control flow through said opening and from said passageway.

5. A device of the type described, comprising a vertical elongated container; a sleeve-like member disposed within said container and spaced from the walls thereof, the container and the sleeve-like member being in communication adjacent their lower ends; a closure member closing the upper ends of the container and the sleeve-like member, said closure member containing a passageway leading from the interior of the sleeve-like member and providing a valve seat at the inner end thereof; an opening through the sleeve-like member adjacent the upper end thereof; a valve member movable between the valve seat and said opening so as to control flow through said opening and from said passageway; and means actuating said valve member responsive to the temperature within the sleeve-like member.

6. A device of the type described, comprising a vertical elongated container; a sleeve-like member disposed within said container and spaced from the walls thereof, the container and the sleeve-like member being in communication adjacent their lower ends; a closure member closing the upper ends of the container and the sleeve-like member, said closure member containing a passageway leading from the interior of the sleeve-like member and providing a valve seat at the inner end thereof; an opening through the sleeve-like member adjacent the upper end thereof; a support within said sleeve-like member; a valve member slidably mounted on said support, one end of said valve member being engageable with the valve seat and the other end being engageable with the opening through the sleeve-like member; and means for actuating said valve member responsive to the temperature within the sleeve-like member.

References Cited in the file of this patent

UNITED STATES PATENTS

| Number | Name | Date |
|---|---|---|
| 1,243,647 | Whittelsey | Oct. 16, 1917 |
| 1,285,991 | Halsey | Nov. 26, 1918 |
| 1,975,868 | Schlumbohn | Oct. 9, 1934 |
| 2,017,497 | Headen | Oct. 15, 1935 |
| 2,030,676 | Atchison | Feb. 11, 1936 |
| 2,083,611 | Marshall | June 15, 1937 |
| 2,135,001 | Finestone | Nov. 1, 1938 |
| 2,168,367 | Kucher | Aug. 8, 1939 |
| 2,182,684 | Venable | Dec. 5, 1939 |
| 2,239,583 | Schmeiding | Apr. 22, 1941 |
| 2,346,112 | Melsheimer | Apr. 4, 1944 |
| 2,459,974 | Turner | Jan. 25, 1949 |